United States Patent
McDonald

(10) Patent No.: US 8,447,763 B2
(45) Date of Patent: May 21, 2013

(54) NUMBERING SYSTEM FOR ANTECEDENTS AND OUTCOMES

(76) Inventor: Capers Walter McDonald, Potomac, MD (US)

(*) Notice: Subject to any disclaimer, the term of this patent is extended or adjusted under 35 U.S.C. 154(b) by 85 days.

(21) Appl. No.: 13/155,267

(22) Filed: Jun. 7, 2011

(65) Prior Publication Data

US 2012/0254177 A1 Oct. 4, 2012

Related U.S. Application Data

(60) Provisional application No. 61/469,320, filed on Mar. 30, 2011.

(51) Int. Cl.
*G06F 7/00* (2006.01)
*G06F 17/30* (2006.01)

(52) U.S. Cl.
USPC .......................................................... 707/737

(58) Field of Classification Search
USPC ................................................. 707/737, 777
See application file for complete search history.

(56) References Cited

PUBLICATIONS

Cole, Terry; "Encyclopedia of Genealogy: Dollarhide System"; Jul. 18, 2008; http://www.eogen.com/DollarhideSystem.*

* cited by examiner

*Primary Examiner* — Hosain Alam
*Assistant Examiner* — Van Oberly
(74) *Attorney, Agent, or Firm* — Sinorica, LLC

(57) ABSTRACT

A numbering system for antecedents and outcomes providing a method for numbering antecedents and outcomes that reveals underlying information of relationships. The numbering system for antecedents and outcomes utilizes a mathematical relationship and an antecedent's or outcome's existing characterizing information to assign a unique indexing number identifying each antecedent and outcome. In an antecedent numbering system, the unique indexing number is able to provide information about the contributor line number, the cohort, the combination of the preceding multiple antecedents, and the sequence number of the outcome. In an outcomes numbering system, the unique indexing number provides information about the sequence line number, the cohort, the combination of the antecedents, and the order number of the outcomes.

15 Claims, 23 Drawing Sheets

Secondary Line Number by Cohort = $S_C = P_C + 2^{C-2}$

Where: $C$ = <u>Cohort Number</u> of both immediate Antecedents $P_C$ = <u>Primary Line Number</u> in Cohort C (such as $P_1$ or $P_6$)

$S_C$ = <u>Secondary Line Number</u> paired with $P_C$ (such as $S_2$ or $S_7$)

And: First Cohort is the beginning outcome and is assigned as Cohort 1.

First Primary Line Number, $P_1$, is Line 1.

First Secondary Line is in Cohort 2 (calculated as $S_2 = 1 + 1 = 2$).

Secondary Lines are designated as Primaries in their next prior Cohort.

Multiple Primary and Secondary Lines may be paired in each Cohort.

|  | | Antecedents | | |
|---|---|---|---|---|
|  | Cohort 1 | Cohort 2 | Cohort 3 | Cohort 4 |
| *Line 1* : | 1.1 | 1.2 | 1.3 | 1.4 |
| *Line 5* : | | | | 5.4 |
| *Line 3* : | | | 3.3 | 3.4 |
| *Line 7* : | | | | 7.4 |
| *Line 2* : | | 2.2 | 2.3 | 2.4 |
| *Line 6* : | | | | 6.4 |
| *Line 4* : | | | 4.3 | 4.4 |
| *Line 8* : | | | | 8.4 |
| *Number of Lines* : | 1 | 2 | 4 | 8 |

FIGURE 1A

| | | | 1.4<br>Laki's Lone Ranger ♂ |
| --- | --- | --- | --- |
| | | 1.3<br>Laki's Luke of B4 Kipkat ♂ | 5.4<br>Laki's Camille ♀ |
| | 1.2<br>Torador's Paradise<br>Tonkinese ♂<br>Champagne Mink | | 3.4<br>Sonham's Chat-O-Nerf Brut ♂ |
| | | 3.3<br>Sonham's Emily Jo of Torador ♀ | 7.4<br>Sonham's Molly Rob ♀ |
| 1.1<br>Panache X Antigone Kitten<br>Tonkinese ♀<br>Champagne Mink | | | 2.4<br>B4 Just Us of Seaflower ♂ |
| | | 2.3<br>B4 Kipkat Jesse Justice of Torador ♂ | 6.4<br>B4's Mai Bridgette of Kipkat ♀ |
| | 2.2<br>Torador's Antigone<br>of Seaflower<br>Tonkinese ♀<br>Platinum Mink<br>( U.S. Grand Champion ) | | 4.4<br>Laki's Luke of B4 Kipkat ♂ |
| | | 4.3<br>Torador's Portia ♀ | 8.4<br>Sonham's Emily Jo of Torador ♀ |

FIGURE 1B

| | Level 1 | Antecedents OR Outcomes | | |
|---|---|---|---|---|
| | | Level 2 | Level 3 | Level 4 |
| *Factor 1*: | 1.1 | 1.2 | 1.3 | 1.4 |
| *Factor 10*: | | | | 10.4 |
| *Factor 19*: | | | | 19.4 |
| *Factor 4*: | | | 4.3 | 4.4 |
| *Factor 13*: | | | | 13.4 |
| *Factor 22*: | | | | 22.4 |
| *Factor 7*: | | | 7.3 | 7.4 |
| *Factor 16*: | | | | 16.4 |
| *Factor 25*: | | | | 25.4 |
| *Factor 2*: | | 2.2 | 2.3 | 2.4 |
| *Factor 11*: | | | | 11.4 |
| *Factor 20*: | | | | 20.4 |
| *Factor 5*: | | | 5.3 | 5.4 |
| *Factor 14*: | | | | 14.4 |
| *Factor 23*: | | | | 23.4 |
| *Factor 8*: | | | 8.3 | 8.4 |
| *Factor 17*: | | | | 17.4 |
| *Factor 26*: | | | | 26.4 |
| *Factor 3*: | | 3.2 | 3.3 | 3.4 |
| *Factor 12*: | | | | 12.4 |
| *Factor 21*: | | | | 21.4 |
| *Factor 6*: | | | 6.3 | 6.4 |
| *Factor 15*: | | | | 15.4 |
| *Factor 24*: | | | | 24.4 |
| *Factor 9*: | | | 9.3 | 9.4 |
| *Factor 18*: | | | | 18.4 |
| *Factor 27*: | | | | 27.4 |
| Number Factors | 1 | 3 | 9 | 27 |

FIGURE 2A

|  | Level 1 | Antecedents Level 2 | Level 3 | Level 4 |
|---|---|---|---|---|
| *Factor 1:* | 1.1 Secession | 1.2 Economics | 1.3 Capitalism | 1.4 Products |
| *Factor 10:* | | | | 10.4 Labor |
| *Factor 19:* | | | | 19.4 Technologies |
| *Factor 4:* | | | 4.3 Trade Relations | 4.4 Cash Crops |
| *Factor 13:* | | | | 13.4 Manufactures |
| *Factor 22:* | | | | 22.4 Partners |
| *Factor 7:* | | | 7.3 Competition | 7.4 Regionalism |
| *Factor 16:* | | | | 16.4 Independence |
| *Factor 25:* | | | | 25.4 Politics |
| *Factor 2:* | | 2.2 Governance | 2.3 Federalism | 2.4 Regulation |
| *Factor 11:* | | | | 11.4 Representation |
| *Factor 20:* | | | | 20.4 Finance |
| *Factor 5:* | | | 5.3 Nationalism | 5.4 Expansion |
| *Factor 14:* | | | | 14.4 Lawmaking |
| *Factor 23:* | | | | 23.4 Liberties |
| *Factor 8:* | | | 8.3 Colonzation | 8.4 Locations |
| *Factor 17:* | | | | 17.4 Regency |
| *Factor 26:* | | | | 26.4 Freedoms |
| *Factor 3:* | | 3.2 Militarism | 3.3 Militia | 3.4 Expectations |
| *Factor 12:* | | | | 12.4 Heritage |
| *Factor 21:* | | | | 21.4 Readiness |
| *Factor 6:* | | | 6.3 Leaders | 6.4 Outlook |
| *Factor 15:* | | | | 15.4 Experience |
| *Factor 24:* | | | | 24.4 Training |
| *Factor 9:* | | | 9.3 Supplies | 9.4 Availability |
| *Factor 18:* | | | | 18.4 Logistics |
| *Factor 27:* | | | | 27.4 Suppliers |
| *Number Factors:* | *1* | *3* | *9* | *27* |

FIGURE 2B

| | Outcomes | | | |
|---|---|---|---|---|
| | Game 1 | Game 2 | Game 3 | Game 4 |
| Sequence 1 : | 1.1 WIN 1 | 1.2 WIN 2 | 1.3 WIN 3 | 1.4 WIN 4 = Overall # 1 |
| Sequence 10 : | | | | 10.4 WIN 3 DRAW 1 = Tied # 2 |
| Sequence 19 : | | | | 19.4 WIN 3 LOSE 1 = Tied # 3 |
| Sequence 4 : | | | 4.3 WIN 2 DRAW 1 | 4.4 WIN 3 DRAW 1 = Tied # 2 |
| Sequence 13 : | | | | 13.4 WIN 2 DRAW 2 = Tied # 4 |
| Sequence 22 : | | | | 22.4 WIN 2 DRAW 1 LOSE 1 |
| Sequence 7 : | | | 7.3 WIN 2 LOSE 1 | 7.4 WIN 3 LOSE 1 = Tied # 3 |
| Sequence 16 : | | | | 16.4 WIN 2 DRAW 1 LOSE 1 |
| Sequence 25 : | | | | 25.4 WIN 2 LOSE 2 |
| Sequence 2 : | | 2.2 WIN 1 DRAW 1 | 2.3 WIN 2 DRAW 1 | 2.4 WIN 3 DRAW 1 = Tied # 2 |
| Sequence 11 : | | | | 11.4 WIN 2 DRAW 2 = Tied # 4 |
| Sequence 20 : | | | | 20.4 WIN 2 DRAW 1 LOSE 1 |
| Sequence 5 : | | | 5.3 WIN 1 DRAW 2 | 5.4 WIN 2 DRAW 2 = Tied # 4 |
| Sequence 14 : | | | | 14.4 WIN 1 DRAW 3 |
| Sequence 23 : | | | | 23.4 WIN 1 DRAW 2 LOSE 1 |
| Sequence 8 : | | | 8.3 WIN 1 DRAW 1 LOSE 1 | 8.4 WIN 2 DRAW 1 LOSE 1 |
| Sequence 17 : | | | | 17.4 WIN 1 DRAW 2 LOSE 1 |
| Sequence 26 : | | | | 26.4 WIN 1 DRAW 1 LOSE 2 |
| Sequence 3 : | | 3.2 WIN 1 LOSE 1 | 3.3 WIN 2 LOSE 1 | 3.4 WIN 3 LOSE 1 = Tied # 3 |
| Sequence 12 : | | | | 12.4 WIN 2 DRAW 1 LOSE 1 |
| Sequence 21 : | | | | 21.4 WIN 2 LOSE 2 |
| Sequence 6 : | | | 6.3 WIN 1 DRAW 1 LOSE 1 | 6.4 WIN 2 DRAW 1 LOSE 1 |
| Sequence 15 : | | | | 15.4 WIN 1 DRAW 2 LOSE 1 |
| Sequence 24 : | | | | 24.4 WIN 1 DRAW 1 LOSE 2 |
| Sequence 9 : | | | 9.3 WIN 1 LOSE 2 | 9.4 WIN 2 LOSE 2 |
| Sequence 18 : | | | | 18.4 WIN 1 DRAW 1 LOSE 2 |
| Sequence 27 : | | | | 27.4 WIN 1 LOSE 3 |
| Number of Sequences : | 1 | 3 | 9 | 27 |

FIGURE 2C

|  | Antecedents | | | |
|---|---|---|---|---|
|  | Cohort 1 | Cohort 2 | Cohort 3 | Cohort 4 |
| *Contributor 1* : | 1.1 | 1.2 | 1.3 | 1.4 |
| *Contributor 17* : | | | | 17.4 |
| *Contributor 33* : | | | | 33.4 |
| *Contributor 1* : | | | | 49.4 |
| *Contributor 5* : | | | 5.3 | 5.4 |
| *Contributor 21* : | | | | 21.4 |
| *Contributor 37* : | | | | 37.4 |
| *Contributor 53* : | | | | 53.4 |
| *Contributor 9* : | | | 9.3 | 9.4 |
| *Contributor 25* : | | | | 25.4 |
| *Contributor 41* : | | | | 41.4 |
| *Contributor 57* : | | | | 57.4 |
| *Contributor 13* : | | | 13.3 | 13.4 |
| *Contributor 29* : | | | | 29.4 |
| *Contributor 45* : | | | | 45.4 |
| *Contributor 61* : | | | | 61.4 |
| *Contributor 2* : | | 2.2 | 2.3 | 2.4 |
| *Contributor 18* : | | | | 18.4 |
| *Contributor 34* : | | | | 34.4 |
| *Contributor 50* : | | | | 50.4 |
| *Contributor 6* : | | | 6.3 | 6.4 |
| *Contributor 22* : | | | | 22.4 |
| *Contributor 38* : | | | | 38.4 |
| *Contributor 54* : | | | | 54.4 |
| *Contributor 10* : | | | 10.3 | 10.4 |
| *Contributor 26* : | | | | 26.4 |
| *Contributor 42* : | | | | 42.4 |
| *Contributor 58* : | | | | 58.4 |
| *Contributor 14* : | | | 14.3 | 14.4 |
| *Contributor 30* : | | | | 30.4 |
| *Contributor 46* : | | | | 46.4 |
| *Contributor 62* : | | | | 62.4 |
| *Contributor 3* : | | 3.2 | 3.3 | 3.4 |
| *Contributor 19* : | | | | 19.4 |
| *Contributor 35* : | | | | 35.4 |
| *Contributor 51* : | | | | 51.4 |
| *Contributor 7* : | | | 7.3 | 7.4 |
| *Contributor 23* : | | | | 23.4 |
| *Contributor 39* : | | | | 39.4 |
| *Contributor 55* : | | | | 55.4 |
| *Contributor 11* : | | | 11.3 | 11.4 |
| *Contributor 27* : | | | | 27.4 |
| *Contributor 43* : | | | | 43.4 |
| *Contributor 59* : | | | | 59.4 |
| *Contributor 15* : | | | 15.3 | 15.4 |
| *Contributor 31* : | | | | 31.4 |
| *Contributor 47* : | | | | 47.4 |
| *Contributor 63* : | | | | 63.4 |
| *Contributor 4* : | | 4.2 | 4.3 | 4.4 |
| *Contributor 20* : | | | | 20.4 |
| *Contributor 36* : | | | | 36.4 |
| *Contributor 52* : | | | | 52.4 |
| *Contributor 8* : | | | 8.3 | 8.4 |
| *Contributor 24* : | | | | 24.4 |
| *Contributor 40* : | | | | 40.4 |
| *Contributor 56* : | | | | 56.4 |
| *Contributor 12* : | | | 12.3 | 12.4 |
| *Contributor 28* : | | | | 28.4 |
| *Contributor 44* : | | | | 44.4 |
| *Contributor 60* : | | | | 60.4 |
| *Contributor 16* : | | | 16.3 | 16.4 |
| *Contributor 32* : | | | | 32.4 |
| *Contributor 48* : | | | | 48.4 |
| *Contributor 64* : | | | | 64.4 |
| *Number of Lines :* | 1 | 4 | 16 | 64 |

FIGURE 3

Secondary Line Number by Cohort = $\boxed{S_C = P_C + 2^{C-2}}$

Where: C = Cohort Number of both immediate Antecedents $P_C$ = Primary Line Number in Cohort C (such as $P_1$ or $P_6$)

$S_C$ = Secondary Line Number paired with $P_C$ (such as $S_2$ or $S_7$)

And: First Cohort is the beginning outcome and is assigned as Cohort 1.

First Primary Line Number, $P_1$, is Line 1.

First Secondary Line is in Cohort 2 (calculated as $S_2 = 1 + 1 = 2$).

Secondary Lines are designated as Primaries in their next prior Cohort.

Multiple Primary and Secondary Lines may be paired in each Cohort.

FIGURE 4

| COHORT<br>C | PRIMARY<br>LINE *<br>$P_C$ | + | $2^{C-2}$ | = | SECONDARY<br>LINE<br>$S_C$ |
|---|---|---|---|---|---|
| 2 | 1 | | 1 | | 2 |
| 3 | 1 | | 2 | | 3 |
| 3 | 2 | | 2 | | 4 |
| 4 | 1 | | 4 | | 5 |
| 4 | 2 | | 4 | | 6 |
| 4 | 3 | | 4 | | 7 |
| 4 | 4 | | 4 | | 8 |
| 5 | 1 | | 8 | | 9 |
| 5 | 2 | | 8 | | 10 |
| 5 | 3 | | 8 | | 11 |
| 5 | 4 | | 8 | | 12 |
| 5 | 5 | | 8 | | 13 |
| 5 | 6 | | 8 | | 14 |
| 5 | 7 | | 8 | | 15 |
| 5 | 8 | | 8 | | 16 |
| 6 | 1 | | 16 | | 17 |
| 6 | 2 | | 16 | | 18 |
| 6 | 3 | | 16 | | 19 |
| 6 | 4 | | 16 | | 20 |
| 6 | 5 | | 16 | | 21 |
| 6 | 6 | | 16 | | 22 |
| 6 | 7 | | 16 | | 23 |
| 6 | 8 | | 16 | | 24 |
| 6 | 9 | | 16 | | 25 |
| 6 | 10 | | 16 | | 26 |
| 6 | 11 | | 16 | | 27 |
| 6 | 12 | | 16 | | 28 |
| 6 | 13 | | 16 | | 29 |
| 6 | 14 | | 16 | | 30 |
| 6 | 15 | | 16 | | 31 |
| 6 | 16 | | 16 | | 32 |

\* A Primary Line Number, $P_C$, must be less than or equal to $2^{C-2}$ to appear in any Cohort.

FIGURE 6A

| GENERATION NUMBER | PATERNAL LINE | + | GENERATION CONSTANT | = | MATERNAL LINE |
|---|---|---|---|---|---|
| 2 | 1 | | 1 | | 2 |
| 3 | 1 <br> 2 | | 2 <br> 2 | | 3 <br> 4 |
| 4 | 1 <br> : <br> 4 | | 4 <br> : <br> 4 | | 5 <br> : <br> 8 |
| 5 | 1 <br> : <br> 8 | | 8 <br> : <br> 8 | | 9 <br> : <br> 16 |
| 6 | 1 <br> : <br> 16 | | 16 <br> : <br> 16 | | 17 <br> : <br> 32 |
| 7 | 1 <br> : <br> 32 | | 32 <br> : <br> 32 | | 33 <br> : <br> 64 |
| 8 | 1 <br> : <br> 64 | | 64 <br> : <br> 64 | | 65 <br> : <br> 128 |
| 9 | 1 <br> : <br> 128 | | 128 <br> : <br> 128 | | 129 <br> : <br> 256 |
| 10 | 1 <br> : <br> 256 | | 256 <br> : <br> 256 | | 257 <br> : <br> 512 |
| 11 | 1 <br> : <br> 512 | | 512 <br> : <br> 512 | | 513 <br> : <br> 1,024 |

Antecedents

|  | Cohort 1 | Cohort 2 | Cohort 3 | Cohort 4 |
|---|---|---|---|---|
| Line 1: | $P_1 = 1$ \| $C_1 = 1$ | $P_2 = P_1 = 1$ \| $C_2 = C_1 + 1 = 2$ | $P_3 = P_2 = 1$ \| $C_3 = C_2 + 1 = 3$ | $P_4 = P_3 = 1$ \| $C_4 = C_3 + 1 = 4$ |
| Line 5: |  |  |  | $S_4(P_1) = P_1 + 2^{C_4-2}$ $S_4(P_1) = 1 + 4 = 5$ \| $C_4 = 4$ |
| Line 3: |  |  | $P_3 = S_3(P_1) = 3$ | $C_4 = 4$ |
| Line 7: |  |  |  | $S_4(P_3) = P_3 + 2^{C_4-2}$ $S_4(P_3) = 3 + 4 = 7$ \| $C_4 = 4$ |
| Line 2: |  | $S_2(P_1) = P_1 + 2^{C_2-2}$ $S_2(P_1) = 1 + 1 = 2$ \| $C_2 = 2$ | $P_2 = S_2(P_1) = 2$ | $C_4 = 4$ |
| Line 6: |  |  | $S_3(P_2) = P_2 + 2^{C_3-2}$ $S_3(P_2) = 2 + 2 = 4$ | $S_4(P_2) = P_2 + 2^{C_4-2}$ $S_4(P_2) = 2 + 4 = 6$ \| $C_4 = 4$ |
| Line 4: |  |  |  | $P_4 = S_3(P_2) = 4$ \| $C_4 = 4$ |
| Line 8: |  |  |  | $S_4(P_4) = P_4 + 2^{C_4-2}$ $S_4(P_4) = 4 + 4 = 8$ \| $C_4 = 4$ |
| Number of Lines: | $2^{C_1-1} = 2^0 = 1$ | $2^{C_2-1} = 2^1 = 2$ | $2^{C_3-1} = 2^2 = 4$ | $2^{C_4-1} = 2^3 = 8$ |

| SECRETARIAT 1970 (USA) | 1.1 BOLD RULER 1954 (USA) | 1.3 NASRULLAH 1940 (Gr.Br.) | 1.4 NEARCO 1935 (It.) | 1.5 PHAROS 1920 (Gr.Br.) | 1.6 PHALARIS 1913 (Gr.Br.) |
|---|---|---|---|---|---|
| | | | | | 17.6 SCAPA FLOW 1914 (Gr.Br.) |
| | | | | 9.5 NOGARA 1928 (It.) | 9.6 HAVRESAC 1915 (Fr.) |
| | | | | | 25.6 CATNIP 1910 (Ir.) |
| | | | 5.4 MUMTAZ BEGUM 1932 (Fr.) | 5.5 BLENHEIM 1927 (Gr.Br.) | 5.6 BLANDFORD 1919 (Ir.) |
| | | | | | 21.6 MALVA 1919 (Gr.Br.) |
| | | | | 13.5 MUMTAZ MAHAL 1921 (Gr.Br.) | 13.6 THE TETRARCH 1911 (Ir.) |
| | | | | | 29.6 LADY JOSEPHINE 1912 (Gr.Br.) |
| | | 3.3 MISS DISCO 1944 (USA) | 3.4 DISCOVERY 1931 (USA) | 3.5 DISPLAY 1923 (USA) | 3.6 FAIR PLAY 1905 (USA) |
| | | | | | 19.6 CICUTA 1919 (Gr.Br.) |
| | | | | 11.5 ARIADNE 1926 (USA) | 11.6 LIGHT BRIGADE 1910 (Gr.Br.) |
| | | | | | 27.6 ADRIENNE 1919 (USA) |
| | | | 7.4 OUTDONE 1936 (USA) | 7.5 POMPEY 1923 (USA) | 7.6 SUN BRIAR 1915 (Fr.) |
| | | | | | 23.6 CLEOPATRA 1917 (USA) |
| | | | | 15.5 SWEEP OUT 1926 (USA) | 15.6 SWEEP ON 1916 (USA) |
| | | | | | 31.6 DUGOUT 1922 (USA) |
| | 2.2 SOMETHING ROYAL 1952 (USA) | 2.3 PRINCE QUILLO 1940 (Ir.) | 2.4 PRINCE ROSE 1928 (Gr.Br.) | 2.5 ROSE PRINCE 1919 (Fr.) | 2.6 PRINCE PALATINE 1908 (Gr.Br.) |
| | | | | | 18.6 EGLANTINE 1906 (Fr.) |
| | | | | 10.5 INDOLENCE 1920 (Gr.Br.) | 10.6 GAY CRUSADER 1914 (Gr.Br.) |
| | | | | | 26.6 BARRIER 1910 (Gr.Br.) |
| | | | 6.4 COSQUILLA 1933 (Gr.Br.) | 6.5 PAPYRUS 1920 (Gr.Br.) | 6.6 TRACERY 1909 (USA) |
| | | | | | 22.6 MISS MATTY 1914 (Gr.Br.) |
| | | | | 14.5 QUICK THOUGHT 1918 (Gr.Br.) | 14.6 WHITE EAGLE 1905 (Gr.Br.) |
| | | | | | 30.6 MINDFUL 1913 (Gr.Br.) |
| | | 4.3 IMPERATRICE 1038 (USA) | 4.4 CARUSO 1927 (USA) | 4.5 POLYMELIAN 1914 (Gr.Br.) | 4.6 POLYMELUS 1902 (Gr.Br.) |
| | | | | | 20.6 PASQUITA 1907 (Gr.Br.) |
| | | | | 12.5 SWEET MUSIC 1917 (USA) | 12.6 HARMONICON 1910 (USA) |
| | | | | | 28.6 ISETTE 1910 (Gr.Br.) |
| | | | 8.4 CINQUEPACE 1934 (USA) | 8.5 BROWN BUD 1924 (USA) | 8.6 BROWN PRINCE 1914 (Gr.Br.) |
| | | | | | 24.6 JUNE ROSE 1916 (USA) |
| | | | | 16.5 ASSIGNATION 1930 (USA) | 16.6 TEDDY 1913 (Fr.) |
| | | | | | 32.6 CINQ A SEPT 1924 (Gr.Br.) |

FIGURE 8

Generation 4

1.4-1.2 Walter Herbert McDONALD Jr. was born in 1886 in Georgetown, Georgetown County, SC. He died in 1944 in Florence, Florence County, SC. He was the son of 1.5-2.2 Walter Herbert McDONALD Sr. and 9.5-2.10 Etta Capers CROFT. He married 5.4-1.3 Marian Bernice McDONALD in 1920 in Georgetown, Georgetown County, SC.

5.4-1.3 Marian Bernice McDONALD was born in 1898 in Sampit, Georgetown County, SC. She died in 1982 in Easley, Pickens County, SC. She was the daughter of 5.5-1.6 William Stuart McDONALD and 13.5-1.3 Sarah Emily BOURNE.

Generation 3 children of 1.4-1.2 Walter Herbert McDONALD Jr. and 5.4-1.3 Marian Bernice McDONALD are:

1.3-1.1 Walter Stuart McDonald was born in 1921 in Georgetown, Georgetown County, SC, died in 1976 in Georgetown, Georgetown County, SC, married Mildred Napier Salmon in 1949 in Georgetown, Georgetown County, SC.

1.3-1.2 Emily Capers McDonald was born in 1923 in Georgetown, Georgetown County, SC, married James Johnson Sims Jr. in 1942 in Georgetown, Georgetown County, SC.

1.3-1.3 WalBern McDONALD was born in 1926 in Georgetown, Georgetown County, SC, died in 1995 in Georgetown, Georgetown County, SC, married 3.3-1.4 Cecilia LOCKWOOD in 1951 in Georgetown, Georgetown County, SC.

Generation 5

1.5-2.2 Walter Herbert McDONALD Sr. was born in 1862 in Santee, Williamsburg County, SC. He died in 1923 in Georgetown, Georgetown County, SC. He was the son of 1.6-1.3 Isaac Edwin McDONALD and 17.6-1.2 Magdalin Agnes BLAKELY. He married 9.5-2.10 Etta Capers CROFT in 1883 in Georgetown, Georgetown County, SC.

9.5-2.10 Etta Capers CROFT was born in 1862 in Georgetown, Georgetown County, SC. She died in 1896 in Georgetown, Georgetown County, SC. She was the daughter of 9.6-1.1 William Stephen CROFT and 25.6-1.1 Francis M[arion] WISH.

Generation 4 children of 1.5-2.2 Walter Herbert McDONALD Sr. and 9.5-2.10 Etta Capers CROFT are:

1.4-1.1 Florence Agnes McDonald was born in 1884 in Georgetown, Georgetown County, SC, died in 1918, married Robert Pou Shuford Abt. 1905 in South Carolina.

1.4-1.2 Walter Herbert McDONALD Jr. was born in 1886 in Georgetown, Georgetown County, SC, died in 1944 in Florence, Florence County, SC, married 5.4-1.3 Marian Bernice McDONALD in 1920 in Georgetown, Georgetown County, SC.

1.4-1.3 Paul Huot McDonald was born in 1888 in Georgetown, Georgetown County, SC, died in 1944 in Georgetown County, SC.

1.4-1.4 Julius Stephen McDonald was born in 1891 in Georgetown, Georgetown County, SC, died in 1963.

Generation 4 children of 1.5-2.2 Walter Herbert McDONALD Sr. and Catharine Rosalie [--?--] are:

1.4-2.1 Edward Martin McDonald was born Abt. 1908 in South Carolina, died Aft. 13 Sep 1920.

1.4-2.2 Selma Catherine Rosalie McDonald was born in 1914 in South Carolina, died in 1975.

FIGURE 11

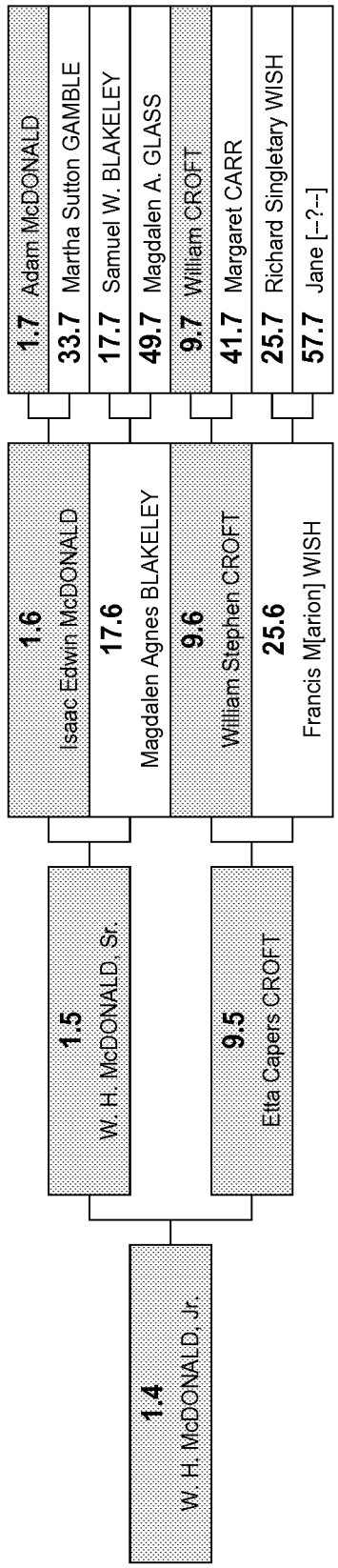
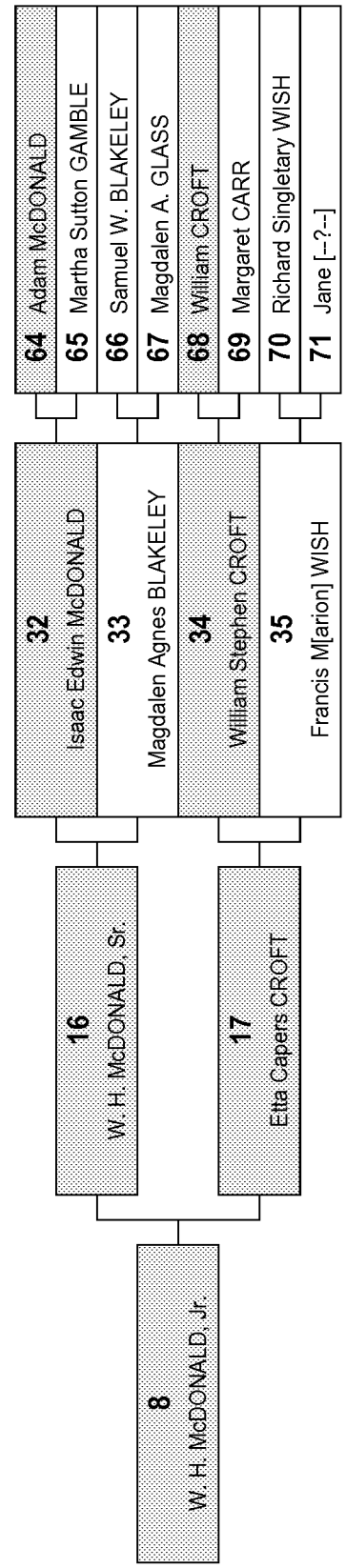
FIGURE 12A
FIGURE 12B

```
                                   Generation 4
1.4-1.2  Walter Herbert McDONALD Jr. was born in 1886 in Georgetown County, SC.
         He was the son of 1.5-2.2 Walter Herbert McDONALD Sr. and 9.5-2.10 Etta Capers CROFT.
         He married 5.4-1.3 Marian Bernice McDONALD in 1920 in Georgetown County, SC.

5.4-1.3  Marian Bernice McDONALD was born in 1898 in Georgetown County, SC.
         She was the daughter of 5.5-1.6 William Stuart McDONALD and 13.5-1.3 Sarah Emily BOURNE.

Generation 3 children of 1.4-1.2 Walter Herbert McDONALD Jr. and 5.4-1.3 Marian Bernice McDONALD are:
              1.3-1.1  Walter Stuart McDonald was born in 1921 in Georgetown County, SC.
              1.3-1.2  Emily Capers McDonald was born in 1923 in Georgetown County, SC.
              1.3-1.3  WalBern McDONALD was born in 1926 in Georgetown County, SC.

Generation 5
1.5-2.2  Walter Herbert McDONALD Sr. was born in 1862 in Williamsburg County, SC.
         He was the son of 1.6-1.3 Isaac Edwin McDONALD and 17.6-1.2 Magdalin Agnes BLAKELY.
         He married 9.5-2.10 Etta Capers CROFT in 1883 in Georgetown County, SC.

9.5-2.10 Etta Capers CROFT was born in 1862 in Georgetown County, SC.
         She was the daughter of 9.6-1.1 William Stephen CROFT and 25.6-1.1 Francis M[arion] WISH.

Generation 4 children of 1.5-2.2 Walter Herbert McDONALD Sr. and 9.5-2.10 Etta Capers CROFT are:
              1.4-1.1  Florence Agnes McDonald was born in 1884 in Georgetown County, SC.
              1.4-1.2  Walter Herbert McDONALD Jr. was born in 1886 in Georgetown County, SC.
              1.4-1.3  Paul Huot McDonald was born in 1888 in Georgetown County, SC.
              1.4-1.4  Julius Stephen McDonald was born in 1891 in Georgetown County, SC.

Generation 4 children of 1.5-2.2 Walter Herbert McDONALD Sr. and Catharine Rosalie [--?--] are:
              1.4-2.1  Edward Martin McDonald was born Abt. 1908 in South Carolina.
              1.4-2.2  Selma Catherine Rosalie McDonald was born in 1914 in South Carolina.
```

FIGURE 13A

```
                                   Generation 4
    8.  Walter Herbert McDONALD Jr. was born in 1886 in Georgetown County, SC.
        He was the son of 16. Walter Herbert McDONALD Sr. and 17. Etta Capers CROFT.
        He married 9. Marian Bernice McDONALD in 1920 in Georgetown County, SC.

9.  Marian Bernice McDONALD was born in 1898 in Georgetown County, SC.
        She was the daughter of 18. William Stuart McDONALD and 19. Sarah Emily BOURNE.

Generation 3 children of 8. Walter Herbert McDONALD Jr. and 9. Marian Bernice McDONALD are:
              i.  Walter Stuart McDonald was born in 1921 in Georgetown County, SC.
              ii. Emily Capers McDonald was born in 1923 in Georgetown County, SC.
              4.  WalBern McDONALD was born in 1926 in Georgetown County, SC.

Generation 5
   16.  Walter Herbert McDONALD Sr. was born in 1862 in Williamsburg County, SC.
        He was the son of 32. Isaac Edwin McDONALD and 33. Magdalin Agnes BLAKELY.
        He married 17. Etta Capers CROFT in 1883 in Georgetown County, SC.

17.  Etta Capers CROFT was born in 1862 in Georgetown County, SC.
        She was the daughter of 34. William Stephen CROFT and 35. Francis M[arion] WISH.

Generation 4 children of 16. Walter Herbert McDONALD Sr. and 17. Etta Capers CROFT are:
              i.   Florence Agnes McDonald was born in 1884 in Georgetown County, SC.
              8.   Walter Herbert McDONALD Jr. was born in 1886 in Georgetown County, SC.
              iii. Paul Huot McDonald was born in 1888 in Georgetown County, SC.
              iv.  Julius Stephen McDonald was born in 1891 in Georgetown County, SC.

Generation 4 children of 16. Walter Herbert McDONALD Sr. and Catharine Rosalie [--?--] are:
              i.  Edward Martin McDonald was born Abt. 1908 in South Carolina.
              ii. Selma Catherine Rosalie McDonald was born in 1914 in South Carolina.
```

FIGURE 13B

|  | DESCENDANT | ANCESTORS | | | |
|---|---|---|---|---|---|
| GENERATION: | 5 | 6 | 7 | 8 | 9 |
| LINE 11: | 11.5 | 11.6 | 11.7-1.5 | 11.8 | 11.9 |
| LINE 139: | | | | | 139.9 |
| LINE 75: | | | | 75.8 | 75.9 |
| LINE 203: | | | | | 203.9 |
| LINE 43: | | | 43.7 | 43.8 | 43.9 |
| LINE 171: | | | | | 171.9 |
| LINE 107: | | | | 107.8 | 107.9 |
| LINE 235: | | | | | 235.9 |
| LINE 27: | | 27.6 | 27.7 | 27.8 | 27.9 |
| LINE 155: | | | | | 155.9 |
| LINE 91: | | | | 91.8 | 91.9 |
| LINE 219: | | | | | 219.9 |
| LINE 59: | | | 59.7-1.8 | 59.8 | 59.9 |
| = LINE 11: | | | = 11.7-1.8 | = 11.8 | = 11.9 |
| LINE 187: | | | | | 187.9 |
| = LINE 139: | | | | | = 139.9 |
| LINE 123: | | | | 123.8 | 123.9 |
| = LINE 75: | | | | = 75.8 | = 75.9 |
| LINE 251: | | | | | 251.9 |
| = LINE 203: | | | | | = 203.9 |
| ALL LINES: | 1 | 2 | 4 | 8 | 16 |

FIGURE 14B

*Line 7: WHITE*

7.4.2 ESTHER WHITE, born ca. 1685 and died at Warwick RI, 23 July 1738.
She married (1) at Yarmouth, 7 Nov. 1707, 3.4.0 John Joyce, d. Yarmouth 10 Jan. 1714/5.

7.5.3 JONATHAN WHITE, born at Marshfield 4 June 1658 and died at Yarmouth
bet. 14 July 1736 and 22 Feb. 1737. He married (1) at Yarmouth, 2 Feb. 1682/3,
15.5.0 HESTER NICKERSON, born at Yarmouth last week of Oct. 1656 and died there 8 Feb. 1702/3.

Children of 7.5.3 Jonathan White and 15.5.0 Hester (Nickerson) White,
all prob. b. Yarmouth, are:

- 7.4.1 ELIZABETH WHITE, living unmarried 14 July 1736.
- 7.4.2 ESTHER WHITE, b. ca. 1685; m. 3.4.0 John Joyce.
- 7.4.3 SARAH WHITE, no children found.
- 7.4.4 JONATHAN WHITE, "oldest son" in father's will.
- 7.4.5 EBENEZER WHITE, b. 9 Aug. 1698.
- 7.4.6 JOSEPH WHITE, b. ca. 1702.
- 7.4.7 MARY WHITE, b. prob. Bef. 1703.

7.6.2 PEREGRINE WHITE, born aboard the *Mayflower* at Provincetown Harbor before end of
Nov. 1620 and died at Marshfield 20 July 1704. He married before 6 March 1648/9,
23.6.0 SARAH BASSETT, born at Plymouth ca. 1630 and died at Marshfield 22 Jan. 1711.

Children of 7.6.2 Peregrine White and 23.6.0 Sarah (Bassett) White are:

- 7.5.1 DANIEL WHITE, b. ca. 1649.
- 7.5.2 [--?--], born ca. 1650/1.
- 7.5.3 JONATHAN WHITE, b. Marshfield 4 June 1658; m. 15.5.0 Hester Nickerson.
- 7.5.4 PEREGRINE WHITE, b. ca. 1661.
- 7.5.5 SARAH WHITE, b. Marshfield ca. Oct. 1663.
- 7.5.6 SYLVANUS WHITE, b. Marshfield bef. 1667.
- 7.5.7 MERCY WHITE, b. ca. 1670.

7.7.0 WILLIAM WHITE, born in probably England and died at Plymouth 21 Feb. 1620/1.
He married, perhaps about 1614,
39.7.0 SUSANNA [--?--], born in probably England and died between 18 Dec. 1654 and 2 July 1675.

Children of 7.7.0 William White and 39.7.0 Susanna (--?--) White are:

- 7.6.1 RESOLVED WHITE, b. in Holland or England prob. ca. 1615; m. (1) Judith Vassall.
- 7.6.2 PEREGRINE WHITE, b. aboard *Mayflower* at Provincetown Harbor bef. end Nov. 1620; m. 23.6.0 Sarah Bassett.

FIGURE 15

| DATA ENTRIES | | | SYSTEMATIC VALUES ► from DATA ENTRIES | | | |
|---|---|---|---|---|---|---|
| | | | LINE | . GENERATION . | PAIRING . | SIBLING |
| Your Self: | Name: | Bert FROST | | | | |
| | Birth Date: | Jun-1972 ►| 1 [a] | 1 [b] | 2 [c] | 2 [d] |
| Your Siblings: | Name: | Adam Frost II | | | | |
| | Birth Date: | Jan-1971 ►| 1 | 1 | 2 | 1 [d] |
| Your Father: | Name: | Adam FROST | | | | |
| | Birth Date: | Feb-1941 ►| 1 | 2 [e] | 0 [f] | 1 |
| Father's Siblings: | Name: | Bea Frost | | | | |
| | Birth Date: | Oct-1942 ►| 1 | 2 | 0 | 2 |
| | Name: | Colin Frost | | | | |
| | Birth Date: | Dec-1943 ►| 1 | 2 | 0 | 3 |
| Father's Marriage: | Marr. Date: | Feb-1970 ►| - | - | 2 [c] | - |
| Your Mother: | Name: | Celia McGEE | | | | |
| | Birth Date: | Mar-1946 ►| 2 [g] | 2 | 0 | 3 |
| Mother's Siblings: | Name: | Alice McGee | | | | |
| | Birth Date: | Mar-1944 ►| 2 | 2 | 0 | 1 |
| | Name: | Ben McGee | | | | |
| | Birth Date: | May-1945 ►| 2 | 2 | 0 | 2 |
| Father's Marriage: | Marr. Date: | Mar-1961 ►| - | - | 1 [c] | - |
| Father's Other Wife: | Name: | Amy Oliver | | | | |
| Father's Other Children: | Name: | Amy Frost | | | | |
| | Birth Date: | Sep-1962 ►| 1 | 1 | 1 | 1 |
| | Name: | Beth Frost | | | | |
| | Birth Date: | Nov-1963 ►| 1 | 1 | 1 | 2 |

The following computational operations, annotated above, are automatically completed by computer functions:

[a] First Primary Line Number is assigned as Line 1.

[b] First Generation is assigned as Generation 1.

[c] Pairings are ranked by comparing Marriage Date entries.

[d] Siblings are ranked by comparing Sibling Birth Date entries for each Pairing.

[e] Each next Generation is calculated based on the preceding Generation and entries.

[f] Any unknown or unranked Pairing or Sibling data may be assigned a "0", "?", "U" or other character.

[g] First Secondary Line is in Generation 2 and is calculated as Line 1 + 1 = 2.

FIGURE 17A

Generation 1

1.1-2.2 Bert FROST was born in Jun 1972.
He was the son of 1.2-0.1 Adam FROST and 2.2-0.3 Celia McGEE.

Generation 2

1.2-0.1 Adam FROST was born in Feb 1941. He married Amy Oliver in Mar 1961.

Generation 1 children of 1.2-0.1 Adam FROST and Amy Oliver are:

1.1-1.1 Amy Frost was born in Sep 1962.

1.1-1.2 Beth Frost was born in Nov 1963.

1.2-0.1 Adam FROST married 2.2-0.3 Celia McGEE in Feb 1970.

2.2-0.3 Celia McGEE was born in Mar 1946.

Generation 1 children of 1.2-0.1 Adam FROST and Celia McGEE are:

1.1-2.1 Adam Frost II was born in Jan 1971.

1.1-2.2 Bert FROST was born in Jun 1972.

1.2-0.2 Bea Frost was born in Oct 1942.

1.2-0.3 Colin Frost was born in Dec 1943.

FIGURE 17B

NUMBERING SYSTEM FOR ANTECEDENTS AND OUTCOMES

The current application claims a priority to the U.S. Provisional Patent application Ser. No. 61/469,320 filed on Mar. 30, 2011.

FIELD OF THE INVENTION

The present invention relates generally to a numbering system for antecedents and outcomes that provides a unique indexing number for each antecedent in relationship to a designated outcome, or, inversely, for each of multiple outcomes in relationship to an indicated antecedent. More specifically, the present invention provides a method for providing unique numbers for related outcomes and antecedents using a formula.

BACKGROUND OF THE INVENTION

In many endeavors, specific "cause and effect," outcomes caused by identified antecedents, precursors and successors, "lines of reasoning," or "sequences of information" give rise to the need to uniquely identify all contributors and results and how each is correlated with another in a primary, secondary or more distant relationship. In all cases, maintaining the integrity of the "lines" or "sequences" is paramount, and recording the relationships to indicate succinctly as much useful information as possible is always important and usually forms the basis of any systematic approach to record keeping.

When working with ancestral lineages, for example, both professional and non-professional genealogists most often deal with family "lines" and "generations." However, there is no accepted ancestral numbering system that addresses this apparent need to reliably assign and clearly indicate both lineage and generational information.

The widely-used Ahnentafel method of sequentially numbering individuals in ancestral pedigrees does not directly indicate antecedent lines or generations. This also is the case for the Dollarhide and similar approaches derived from the Ahnentafel method. Until now, there has been no generally accepted mathematically-based alternative to Ahnentafel numbering. Therefore, an improved ancestral numbering system is needed that, at a minimum, provides for these two important indicators. Any such new system also must meet the more general requirements of maintaining integrity of the lines and generations and of recording relationships briefly with as much useful information as possible.

The present invention therefore is applicable for uniquely numbering each ancestral line, generation, partner and sibling in any genealogical record. However, the present invention of a numbering system for antecedents and outcomes is applicable for a number of different applications.

Uniform cohorts of multiple outcomes arise in many situations. A numbering system for outcomes is a direct, if inverse, application of the same formula used for the antecedent cases whenever every cohort of outcomes is uniformly comprised of the same or nearly the same number of multiples. In practice, as in the antecedent cases, a few of the outcomes provided for may be eliminated or "zeroed out" as non-events in any cohort. However, these must be numbered to preserve the order and utility of the numbered relationships.

BRIEF DESCRIPTION OF THE DRAWINGS

FIG. 1A is the initial eight line and cohort numbering relationships for the antecedent pairs numbering system. The inherent symmetry of the newly numbered lines appearing in each cohort is shaded.

FIG. 1B is an example of an animal pedigree using the antecedent pairs numbering system, a specific application of the numbering system for antecedents and outcomes of the present invention. The eight progenitor lines appearing in the first four generations are shown. The inherent symmetry of the newly numbered lines appearing in generation 4 is shaded.

FIG. 2A is the initial factor and level numbering relationships in a three antecedent (primary-secondary-tertiary) numbering system. The inherent symmetry of the newly numbered lines appearing in each cohort is shaded.

FIG. 2B is an example of a numbering system for three antecedents being utilized for an analysis of the American Civil War of the 1860s.

FIG. 2C is an analysis of possible overall outcomes in a four-game competition with three potential single-game outcomes of win-draw-lose is made using the same formula as used in a three antecedent (N=3) case. Three different sequences leading to the same second place record of 3-1-0 in wins-draws-losses are shaded.

FIG. 3 is the initial contributor and cohort numbering relationships in a numbering system for four antecedents (primary-secondary-tertiary-quaternary).

FIG. 4 shows the relationships and rules for the numbering calculations in an antecedent pairs numbering system, a specific application of the numbering system for antecedents and outcomes. In these, the assignment of the beginning outcome as cohort 1 is linked with the exponent of N, the total number of direct contributors, as being C−2. However, if alternatively the beginning outcome's direct antecedents are assigned to be cohort 1, then the exponent of N becomes C−1. Both approaches are valid and currently in use and therefore are accommodated by the numbering system for antecedents and outcomes of the present invention.

FIG. 6A is the first 32 secondary line numbers paired with primary lines 1 through 16 for the first six cohorts of the antecedent pairs numbering system.

FIG. 6B is the first 1,024 maternal (secondary) line numbers paired with paternal (primary) lines 1 through 512 for the first 11 cohorts of the antecedent pairs numbering system. This shows the "generation constant" that increases for all lines in each ancestral generation.

FIG. 7 is the initial eight line and cohort relationship numbering calculations for the first four cohorts in the antecedent pairs numbering system.

FIG. 8 shows an example of a six generations pedigree of a thoroughbred race horse in the antecedent pairs numbering system. The horse's USA breeding ancestry is shaded.

FIG. 11 is an example of two middle generations excerpted from a family ancestry shown in text or book format.

FIG. 12A is four generations excerpted from a family ancestry using the antecedent pairs numbering system, a specific application of the numbering system for antecedents and outcomes.

FIG. 12B shows the absence of numbered lines and generations in the Ahnentafel method for the same family ancestry of FIG. 12A. This becomes more problematic for records presented in text or book format as shown in FIG. 13.

FIG. 13A shows two generations from a family ancestry presented in text or book format using the antecedent pairs numbering system. The numbering for the calculated lines and generations is shown. Additionally shown is the assigned numbering for multiple partners, siblings and half siblings recorded in the antecedent pairs numbering system.

FIG. 13B shows the absence of numbered lines and generations as well as any numbering for certain siblings, other partners and their offspring in the Ahnentafel method for the same family ancestry of FIG. 13A.

FIGS. 14A and 14B are an example of correct secondary line and cohort numbering relationships in the antecedent pairs numbering system applied to a family genealogy.

FIG. 15 is an example of an abbreviated, three-category format for the antecedent pairs numbering system that assigns sibling numbers only for each direct ancestral pairing. This can be satisfactory for presenting any ancestral pedigree of only direct ancestors and their full siblings, but does exclude half-siblings from collateral pairings.

FIG. 17A is one example set of data entries and their systematic values for ancestral genealogies.

FIG. 17B is a computer generated text with antecedent numbering for the generations beginning the book form ancestry of a hypothetical person, Bert Frost.

DETAIL DESCRIPTIONS OF THE INVENTION

Figure 5:
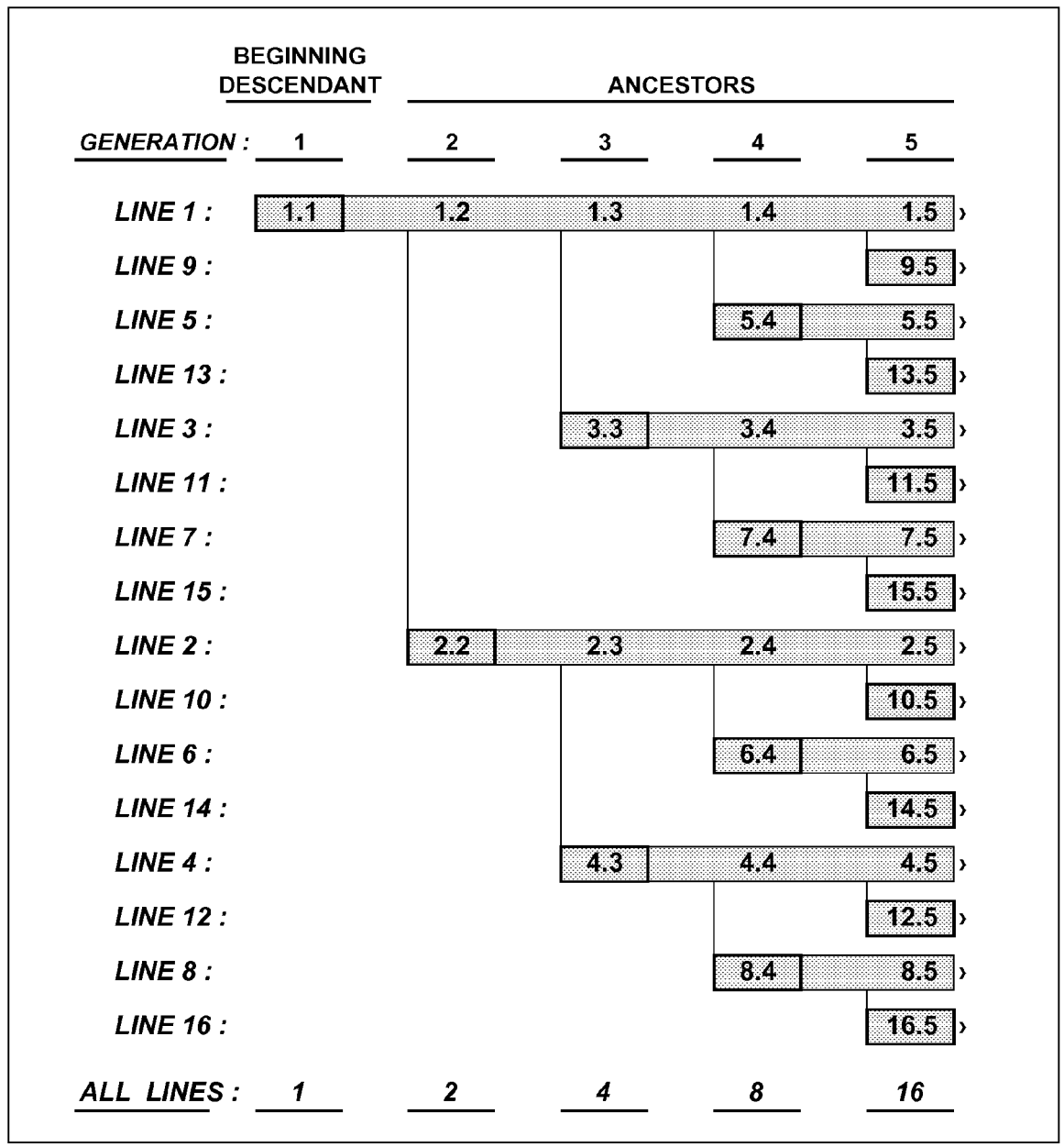
FIG. 5 is the initial 16 lines and cohort numbering relationships for the antecedent pairs numbering system.

All illustrations of the drawings are for the purpose of describing selected aspects or applications of the present invention and are not intended to limit the scope of the present invention.

The present invention is a numbering system for antecedents and outcomes and method for representing related information in a mathematical array by ordering and numbering the individual counterpart nodes. The present invention can be arranged in tabular or other graphical forms, but the present invention can coherently be presented in text or other non-diagrammatic formats as well. The numbering system for antecedents and outcomes uniquely numbers each counterpart in any record of related antecedents and outcomes.

In many endeavors, specific "cause and effect," outcomes caused by identified antecedents, precursors and successors, "lines of reasoning," or "sequences of information" give rise to the need to uniquely identify all contributors and results and how each one is correlated with another in a primary, secondary or more distant relationship. To uniquely number each of the contributors, it is paramount to maintain the integrity of the "lines" and "sequences." Recording the relationships in such a way that indicates succinctly as much useful information as possible is always important and is usually the basis of any systematic approach for record keeping. For this reason, the present invention is a unique numbering system for antecedents and outcomes that provides recordings for the relationships of counterparts in diverse applications. The numbering system for antecedents and outcomes can be used for the indexing of a myriad of different categories including genealogy, animal pedigrees, medical or scientific assessments, analysis of historical events, or any other suitable categories. The method of the present invention utilizes a formula for assigning unique indexing numbers for each of the plurality of antecedents of an outcome, or, inversely, for the plurality of outcomes of an antecedent. The unique indexing numbers can comprise a contributor or successor line number, a cohort number, a combination number, and a counterpart sequence number. The relationships among antecedents and outcomes are readily ascertained based on their unique indexing number. The unique indexing number for each of the antecedents and outcomes is individually calculated and assigned without compiling a comprehensive set, tracing only how it relates to another antecedent or outcome.

Any number of the antecedent multiples can be calculated with associations provided by the following general mathematical relationship:

$$M_{cn} = P_C + (n-1) \times N^{C-2}$$

Where $M_{cn}$ is the contributor line number for the antecedent, $P_C$ is the contributor number for the direct outcome of the antecedent, n is a contributor progression number (an integer from 1 through a maximum of N) for the associated antecedent for the outcome, N is the total number of direct contributors per cohort, and C is the cohort of the antecedent. Provided with an outcome and a plurality of contributing antecedents, each contributing antecedent or outcome is categorized in cohorts. The total number of contributors is the number of antecedents associated with each of the outcomes.

In another embodiment of the present invention, the mathematical relationship is applied in a reverse fashion to number outcomes. In such an embodiment, $M_{cn}$ is the contributor line number for the outcome, $P_C$ is the contributor number for the direct antecedent of the outcome, n is a contributor progression number (an integer from 1 through a maximum of N) for the associated outcome for the antecedent, N is the total number of direct contributors per cohort, and C is the cohort of the outcome.

Each of the contributing antecedent cohorts must uniformly use the same number of multiples. For example, given a cohort, if the number of contributors is two, then each antecedent, also being a descendant to preceding antecedents, possesses two preceding antecedents. In practice, related categories may be eliminated or "zeroed out" to reduce the number of contributors as non-events in cohorts. However, these categories must be numbered to preserve the order and utility of the relationships.

The formula for the present invention is used for the calculation of the contributor line number for an antecedent. As shown in the mathematical relationship of an antecedent and an outcome, the contributor line number is dependent on the contributor line number of the direct outcome of the antecedent, the cohort of the antecedent, the total number of contributors, and the contributor progression number.

Using the cohort number and the contributor progression number, the mathematical relationship of the present invention is able to determine the contributor line number for the first antecedents and the second antecedents. As seen in the example, the primary contributor (the first antecedent) shares the same contributor line number, whereas the secondary contributor (the second antecedent) is provided a unique new contributor line number. When next calculating the antecedents for the first antecedent, the first antecedent becomes an outcome in terms of the mathematical relationship. To ensure each of the contributor lines are unique identifiers of an antecedent line, it is important that the number of total contributors for each outcome remain constant.

For each preceding antecedent, the calculation process is repeated. In each such case, the antecedent already with an assigned unique indexing number becomes an outcome with respect to the mathematical formula. The antecedent number calculation is repeated for the preceding antecedent with an assigned unique indexing number, wherein the preceding antecedent is the antecedent of the contributing antecedent.

When the mathematical relationship of the present invention is used in computer software for automatic calculation of antecedent relationships, the mathematical formula is recursively applied in a loop. Each time the computer software loops, the values of each preceding antecedents are inputted for the calculation of the unique contributor line numbers. The remaining indexing numbers of the unique numbering index are directly assigned based upon their relationship to the original outcome.

The calculation process is repeated, provided with the outcome, the plurality of contributing antecedents, and the plurality of preceding antecedents. The preceding antecedents are the antecedents that are in a preceding cohort in relation to the contributing antecedents. The contributing antecedents are the antecedents that precede the cohort of the outcome. The unique indexing numbers for the plurality of contributing antecedent are calculated using the contributing line number of the outcome. The calculation is repeated for the preceding antecedents once the unique indexing numbers are established for the contributing antecedents. When the unique indexing numbers are being calculated for the preceding antecedents, the contributing antecedents become the outcomes and the preceding antecedents become the contributing antecedents with respect to the mathematical relationship provided by the present invention.

FIG. 4 shows the relationships and rules for the numbering calculations in an antecedent pairs numbering system, a specific application of the numbering system for antecedents and outcomes. Particularly note that the assignment of the beginning outcome as cohort 1 is linked with the exponent of N, the total number of direct contributors, as being C−2. However, if alternatively the beginning outcome's direct antecedents are assigned to be cohort 1, then the exponent of N becomes C−1. In the example of ancestral pedigrees, therefore, if the beginning descendant is assigned as generation 1, the exponent of N will be C−2. If instead, the beginning descendant's parents are assigned as generation 1 (and usually referred to as "the first ancestral generation"), then the exponent of N will be C−1. Both approaches are valid and currently exist among genealogists and their publications. Therefore, these alternatives are accommodated by and do not alter the relevance or relationships among the information provided by the numbering system for antecedents and outcomes of the present invention.

Figure 14A:
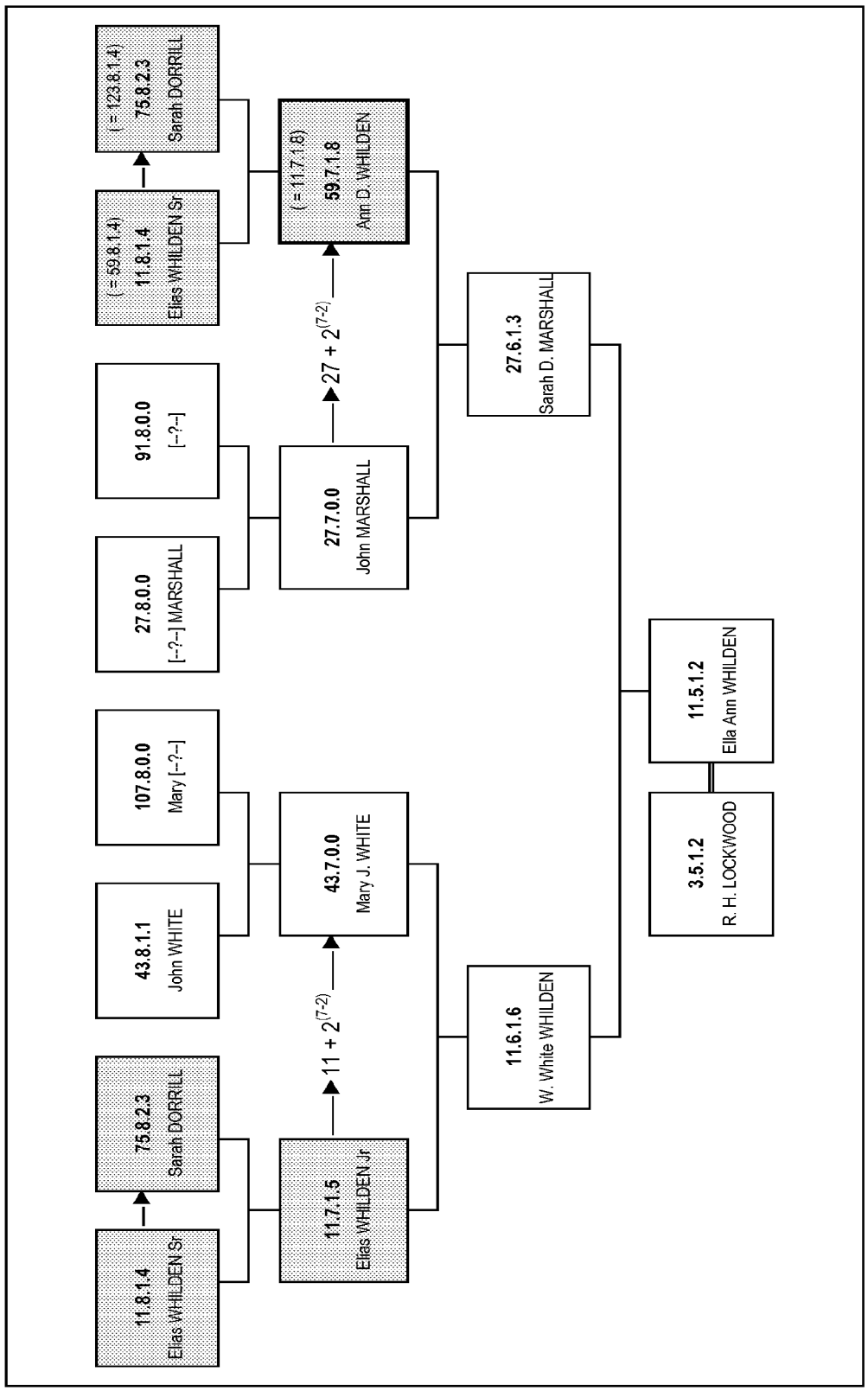
Figure 16:
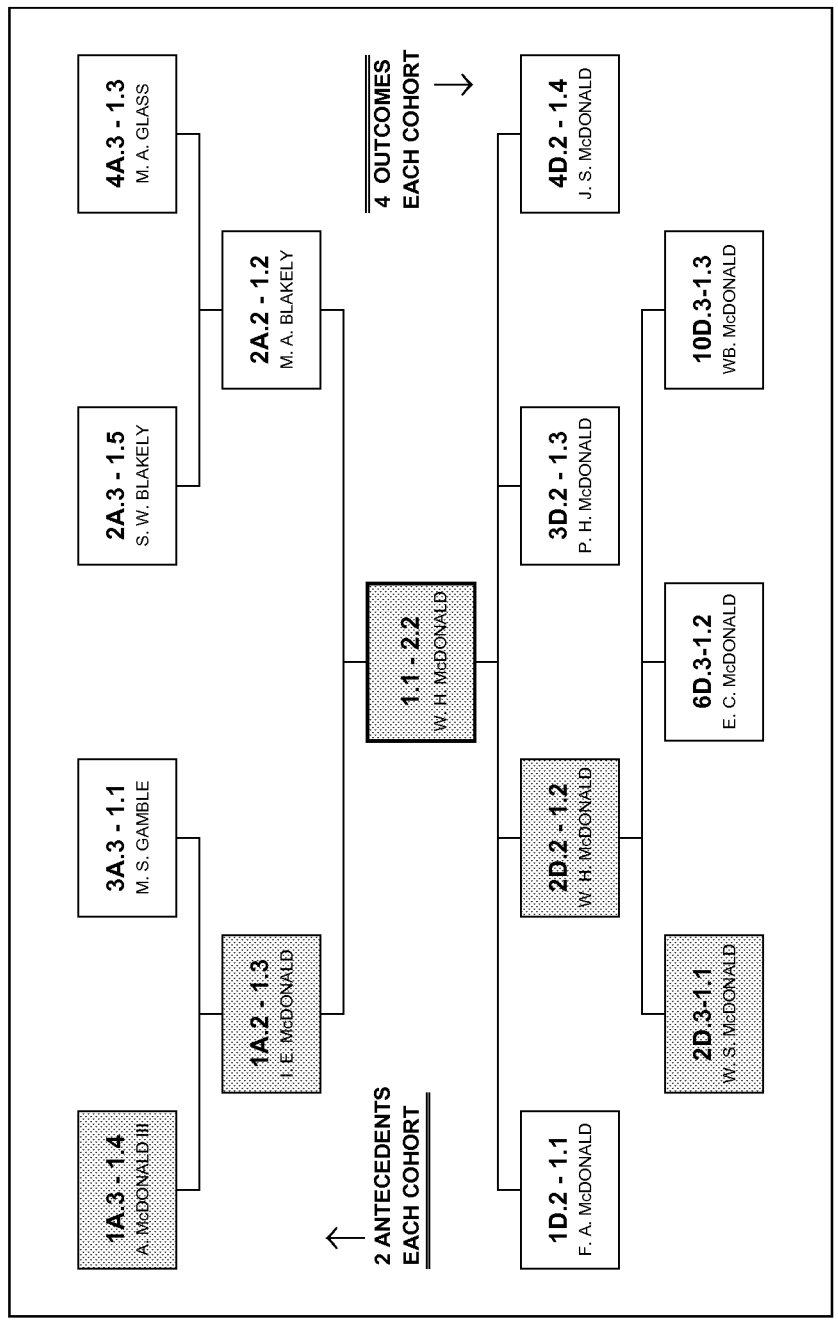
FIG. 16 is an example of a "bowtie" presentation chart simultaneously showing both the antecedents and outcomes for relationships in the antecedent pairs numbering system applied to a family genealogy. A person is selected to center and begin the presentation and is assigned the line and generation number 1.1. His parents' partner and sibling identifiers are appended to this to generate his unique index number 1.1-2.2. To differentiate the ascending and descending relationships in the single chart, letters are added two the "directional" groups—"A" for the ancestors (antecedents) and "D" for the descendants (outcomes).

Two important cases for the numbering of lines and cohorts should be described. Especially in an example such as an ancestral genealogy, the antecedent pairs numbering system requires that secondary line numbers be assigned consistently as branching from the primary line in the same cohort. The first case is that descendants of siblings in any cohort not leading to the chosen cohort 1 descendant must not be numbered forward towards more recent cohorts, even though all siblings have been assigned unique individual numbers in their cohort. This would result in different individuals having identical numbers and is not the ascending, "directional" design of the present invention. A second case is that secondary line numbering for pairings from common antecedents must be calculated and assigned consistently to the corresponding secondary line number as if the common antecedent relationship does not exist (or is unknown). Otherwise, as shown in FIG. 14A and FIG. 14B, individual numbering would be duplicated, and earlier secondary lines along the more recent secondary line also would be mis-numbered and effectively "lost." For the instances of multiple close antecedent pairings, the secondary line numbers for the two lines can be continued to preceding primary cohorts to ensure unique numbering of both the related secondary lines and individuals. By continuing from the preceding primary cohort, the unique numbering for the secondary lines are replaced or retained as equivalent to the original unique indexing number.

To further individualize the unique indexing number, for each antecedent the combination number and the counterpart sequence number are assigned. The combination number and the counterpart sequence numbers are identifiers for antecedents within a group sharing the same contributor line number and cohort number. The combination number and the counterpart sequence number are assigned according to their associated characteristics. An example of such a case is the ancestry for a family with multiple children. Each of the children has the same lineage (contributor line number) and is in the same generation (cohort), but is individualized by their parents' marriage (combination) and own order of birth (counterpart sequence). In a numbering system for outcomes, to further individualize the unique indexing number, the combination number and/or the outcome order (or rank) number are assigned for each outcome. The combination number and the outcome order numbers are identifiers for outcomes within a group sharing the same sequence line number and cohort number. The combination number and the outcome order number are assigned according to their associated characteristics. An example of such a case is the descendancy for a family with several children. Each of the children begins a new lineage (descendant line number) but is in the same generation (cohort) and is individualized by their parents' marriage (combination) and own order of birth (counterpart sequence).

In reference to FIG. 1A and elsewhere, the numbering system for antecedents and outcomes can be used for antecedent pairs. The antecedent line number assigned for each secondary line is calculated from the associated primary line number and cohort number using the mathematical relationship defined by the present invention. In the following example from an ancestral genealogy application, providing a child (outcome) numbered 2.2, with an antecedent line (contributor line number) of 2 in a second generation (cohort), and with this and every other child (outcome) having two parents (antecedents), a father and a mother, the father (the first or primary antecedent) would have a contributor line number of 2, and the mother (the second or secondary antecedent) would have a contributor line number of 4. The father and the mother, being in the generation (cohort) preceding the child (outcome), will be in a generation (cohort) that is always one greater in the same line than the generation (cohort) number of any offspring (outcomes). In this example, the father 2.3 and the mother 4.3 will share a generation (cohort) number of 3. The father, being a primary contributor, has a contributor progression number of 1. The mother, being a secondary contributor, has a contributor progression number of 2. The contributor line number for the father (the first or primary antecedent) and the mother (the second or secondary antecedent) are determined using the associated values as follows:

for the father: $P_C+(1-1)\times 2^{C-2}=P_C+0\times 2=P_C=2$;

for the mother: $S_C=P_C+(2-1)\times 2^{C-2}=P_C+1\times 2=P_C+2=4$.

In, what is perhaps, a simpler description for numbering in the antecedent pairs numbering system, for patrilineal records the numbers given to the maternal (secondary) lines that are paired in each ancestral generation are equal to the father's paternal (primary) line number plus a fixed "generation constant." This added number increases for all lines in each ancestral generation, growing as powers (or multiples) of the "coupling" number, two. This is such that, for example, the "generation constant" added to the paternal line numbers in generation five is always eight, and in generation six is always 16. Relationships among the first 1,024 lines in the antecedent pairing system always will be as shown in FIG. 6B. The "generation constant" added in each generation is always the same as the highest paternal line number appearing in that generation. Also, these two identical numbers always sum to the highest maternal line number in that same generation. So, in each generation the highest maternal line number is always twice the highest paternal line number, as shown. The "generation constant" also is always evident in relating any paternal ancestor to his maternal partner. The difference between their line numbers is always the "generation constant" for that particular generation.

Figure 9:
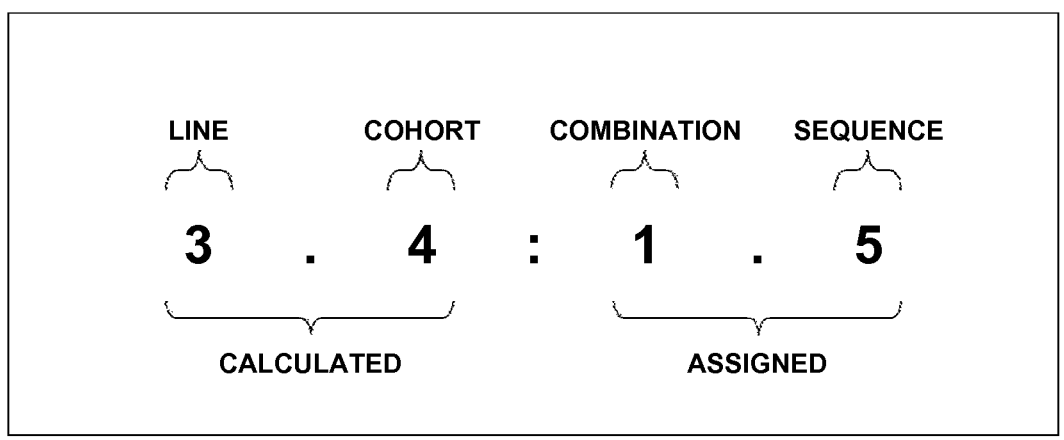
FIG. 9 illustrates in succession the four categories of the contributor line number, the cohort number, the combination number and the sequence number of the antecedent pairs numbering system. The four numbers generally are separated by symbols to distinguish each from one another.

The unique indexing numbers for each antecedent/outcome display the contributor line number, the cohort number, the combination number and the sequence number in succession. The numbers generally are separated by various symbols to distinguish each number from one another. For example, as shown in FIG. 9, providing an antecedent with a contributor line number of three, in the fourth cohort, with a combination number of one, and a sequence number of five, the unique indexing number can be displayed as 3.4:1.5. The unique indexing number can be displayed in any recording style that may be used for record keeping. The recording styles will accommodate the four categories of numbers representing the underlying information of the antecedent. The following shows the four categories separated by the same indicator: 1.2.3.4 or 1-2-3-4 or 1:2:3:4 or 1/2/3/4 or 1|2|3|4. The following indicates the four categories grouped into two types and separated by different indicators: 1.2-3.4 or 1.2:3.4 or 1.2/3.4 or 1.2|3.4 or alternatively 1-2:3-4 or 1-2/3-4 or 1-2|3-4.

Depending on the application of the present invention and the anticipated "counting" needs, any of several category "place holders" may be used for record keeping. The field ranges for the display of the unique indexing number in a computerized application can include self-expanding fields, anticipated number fields, and uniform range fields. Self expanding fields of numbers may be used in many computerized applications. For example, 13.5.2.5 can expand to 12345.97.16.24 or indefinitely. For anticipated number fields, the largest numbers for each field is anticipated and a number of digits are included for each field. For example, 0013.005.02.05 can accommodate up to 9999.999.99.99 in anticipation. For a uniform range field, a uniform range of "place holders" for each field of numbers is used. For example, 13.05.02.05 has two digits in each field and can accommodate up to 99.99.99.99.

In certain cases, the combination number and the sequence number of an antecedent is unknown due to missing information. As a result, the combination number and the sequence number cannot be assigned. For such situations, the system provides alternative recordings for unknown or unranked combinations or counterparts. However, the system requires that the unique indexing numbers be assigned consistently. These alternative recordings should not alter the relevance or relationships among the underlying information provided by the unique indexing number. Care must be taken to prevent the duplication of a unique indexing number arising from insufficient data. When data is unknown or of unknown rank order, the combination number and the sequence number can be numbered using a "0" or recorded as a "?" or a "U" ("unknown"), as in the following examples: 1.2.0.0 or 1-2-0-0 or 1/2/0/0 or alternatively 1.2-0.0 or 1-2:0-0 or 1.2:0.0 or 1.2/0.0 or 1.2|0.0 or 1.2.?.? or 1-2-?-? or 1:2:?:? or 1|2|?|? or alternatively as 1.2-U.U or 1-2:U-U or 1.2/U.U or 1.2|U.U.

An abbreviated, three-category format of the antecedent pairs numbering system assigns sibling numbers only for each direct ancestral pairing. In this approach, numbers representing temporal or other rankings based on birth dates or other information for each sibling are appended to the calculated line and generation numbers for each paternal line. For example, as shown in FIG. 15, the first and second siblings born in direct paternal line 7 in generation 4 for a well-known early American family would be numbered 7.4.1 and 7.4.2, respectively. This can be satisfactory for presenting any ancestral pedigree of only direct ancestors and their full siblings, but does exclude half-siblings from collateral pairings. The "full" format examples of the system assign numbers for both partners and siblings, thereby numbering half-siblings of collateral partners, as described.

As mentioned previously, the numbering system for antecedents and outcomes introduced by the present invention can be used in any application with any contributor, precursor, causal, precedent, progenitor or related antecedent applications. Such applications include the fields of ancestral genealogies and animal/plant breeding pedigrees. In the field of health sciences, the present invention can be applied to genetics, disease management, epidemiology, pharmaceutical drug and biotechnological assessments and other medical studies. In other fields of technology, the present invention can be applied to engineering and technical analysis, industrial safety testing, intelligence and other information analyses. In the field of social sciences, the present invention can be applied to historical analyses, human affairs assessments, and other related-factor analyses. In the legal field, the present invention can be applied to law enforcement studies, lines of reasoning, inquiry, or investigation assessments. In the application of disease management, care in considering underlying causes may be critical to selecting and following treatments to improve a patient's outcome. In the field of pharmaceutical drug development, epidemiological studies and industrial safety, there is a need to organize, record, and assess important test data. In engineering, legal, law enforcement and intelligence, similar analysis is common. In an historical context, this often is embodied in causal or contributing-factor analysis. Pedigrees, breeding studies and genealogies are pursued for animals, plants, or people. In several important applications of the present invention, the larger number of potential antecedents in each cohort is reduced to pairs of mutual or primary and secondary interest. In working with sexual reproduction, for example, this very naturally becomes recording progenitor pairs and their offspring, as well as the more extended relationships among individuals and groups. Ancestral genealogies and animal or plant pedigrees are the general forms of these useful records.

The numbering system for antecedents and outcomes of the present invention provides significant improvement over prior antecedent numbering systems by providing specific information. An example of such a significant improvement is shown in the case of ancestral genealogies. Human ancestors and other pairs have been numbered in various ways for over 400 years and likely for much longer. The accepted approach is simply to number progenitors sequentially to individually number the direct ancestors. This approach is known in the Western world variously as the Ahnentafel, Eytzinger, Sosa or Sosa-Stradonitz method. The numbering begins with an individual, followed by the male and female pairing of the next prior generation and so forth. The Ahnentafel numbering does not directly indicate antecedent "lines" or "generations." Since virtually all genealogist and pedigree users commonly work in such lines and generations, an improved antecedent numbering system is needed that, at a minimum, provides information on an antecedent's line or generation. There has been no known mathematically-based alternative to Ahnentafel numbering until the present invention. The prior simple approach produces meager results where a single, though unique, number for each individual is assigned. Not surprisingly, it also shows some "patterns" in the outcome. In particular, since there are always two progenitors paired, such sequential numbering in a patrilineal system results in the progenitor male being numbered twice the number assigned to his offspring regardless of gender. The progenitor female is always numbered as the paired male's number plus one. Any higher level of information concerning relationships is not shown in the Ahnentafel numbering. Specifically, for calculated results, there is no single identifying "line" or lineage number. Instead of being "Line 1", the primary male ancestral line includes individuals numbered with 2, 4, 8, etc. There is not "generation" information evident within or across lines, except by memorizing which sequential numbers fall into each generation, or the separately using a base-two logarithmic calculation to reveal the generation number. Other mates and siblings also are not accounted for in the Ahnentafel scheme. Numberings of other pairings (additional marriages) or comparable but unique numbering of half-siblings from any other pairing are absent. In reference to FIG. 12A and FIG. 13A, four generations of a family is shown using the numbering system for antecedents and outcomes of the present invention. The antecedent pairs numbering system of the present invention is able to provide and present important information about an antecedent's relationship to a descendant. Additionally, the information displayed provides the generation of any antecedent. In reference to FIG. 12B and FIG. 13B, the same four generations of a family are shown using the Ahnentafel method, relationships between each antecedents and the generation of each antecedents are not as evident.

The present invention is a mathematical relationship that can be implemented by a computer to generate and correlate antecedent numbers. However, the present invention can also be implemented manually, as it is mathematically based and consistent. Due to the consistent nature of the mathematically based numbering system, the present invention is readily adapted for computerization. A computer can easily be programmed to locate and organize direct and earlier antecedents for any contributor, or calculate and characterize more distant relationships as a result of the system's uniform mathematical approach as exemplified in FIG. 17A and FIG. 17B. With the unique indexing numbers, each individual easily is located or referenced without knowing any other information such as his or her date of birth, ancestor names, printed page numbers, etc. Examples of other uses including labeling paper or digital files, reports, images and sources of information.

Any number of antecedent multiples can be calculated, including singlet, doublets, triplets, quadruplets, etc. The following is an example of the adapted mathematical formula for each antecedent for each of the first four multiples:

Antecedent Singles:
For a single (N=1) contributor, the contributor line number assigned for all the cohorts remains the same as the originating primary contributor number in the first cohort, since, for Primary Contributors: $M_{C1}=P_C+(1-1)\times 1^{C-2}=P_C$.

Antecedent Pairs:
For paired (N=2) contributors, the contributor line number assigned for each secondary contributor is calculated from the associated primary contributor line number and cohort number using the relationship, for Primary Contributors: $M_{C1}=P_C=P_C+(1-1)\times 2^{C-2}$ Secondary Contributors: $M_{C2}=S_C=P_C+(2-1)\times 2^{C-2}$.

Antecedent Triads:
Recognizing that there are three antecedents (N=3) for many causal relationships, the antecedent contributor number assigned for each secondary or tertiary contributor is calculated from the associated primary contributor line number and cohort number with relationships, for Primary Contributors: $M_{C1}=P_C=P_C+(1-1)\times 3^{C-2}$ Secondary Contributors: $M_{C2}=S_C=P_C+(2-1)\times 3^{C-2}$ Tertiary Contributors: $M_{C3}=T_C=P_C+(3-1)\times 3^{C-2}$.

Antecedent Quads:
Antecedent contributor line numbers for each secondary, tertiary and quaternary (N=4) contributors is calculated from the associated primary contributor line number and the cohort number with relationships, for Primary Contributors: $M_{C1}=P_C=P_C+(1-1)\times 4^{C-2}$ Secondary Contributors: $M_{C2}=S_C=P_C+(2-1)\times 4^{C-2}$ Tertiary Contributors: $M_{C3}=T_C=P_C+(3-1)\times 4^{C-2}$ Quaternary Contributors: $M_{C4}=Q_C=P_C+(4-1)\times 4^{C-2}$.

The following are examples of the application of the numbering system for antecedents and outcomes:

EXAMPLE 1

Figure 10:
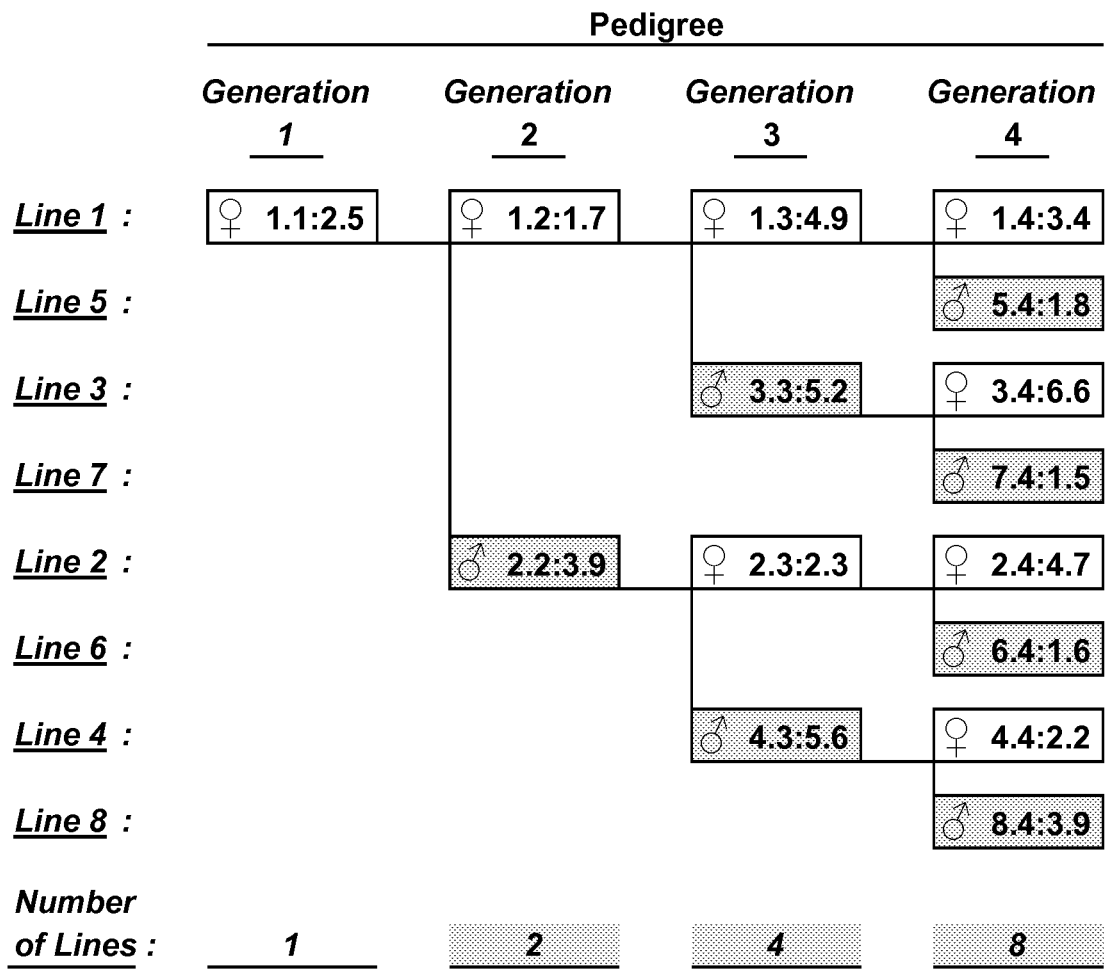
FIG. 10 is an example of a pairs breeding assessment following three successful generations.

In reference to FIG. 8, a six generation pedigree of Secretariat, the exceptional thoroughbred racehorse, is shown. The following graph shown displays the ancestral breeding pedigree of Secretariat. The racehorses preceding Secretariat are tracked and indexed six generations prior. In this example, only the contributor line number and the cohort number of the racehorses are displayed. In reference to FIG. 10, in the first phase of the biological breeding programs, a descendant numbering system proves useful. The second phase assessment of ancestral traits requires an ancestral Pedigree. Note that offspring presented in FIG. 10 are primarily reference to the bearing females rather than the secondary males.

EXAMPLE 2

In reference to FIG. 2B, an historical analysis is shown using the antecedent triads (N=3) formula in one possible analysis of antecedents of the American civil war of the 1860s. In a companion analysis, this can be compared and contrasted with factors and outcomes for other similar events, such as the potential separation of Québec from Canada during the 1980s.

EXAMPLE 3

In reference to FIG. 2C, an analysis of possible overall outcomes in a four-game competition with three potential single-game outcomes of win-draw-lose is made using the same triad (N=3) formula as used for the antecedent cases. This shows that three different sequences (numbers 2, 4 and 10) lead to the cumulative outcome of three wins and one draw, and that this 3-1-0 record is second place to the four-game champion finishing 4-0-0 with four wins. Although each second-place sequence achieves the same 3-1-0 record, sequence 2 has an early draw (tie) in game 2; sequence 4, an intermediate draw in game 3; and sequence 10, a late draw in the final game 4.

Although the invention has been explained in relation to its preferred embodiment, it is to be understood that many other possible modifications and variations can be made without departing from the spirit and scope of the invention as hereinafter claimed.

What is claimed is:

1. A method for numbering antecedents by executing computer-executable instructions stored on a nontransitory computer-readable medium comprises:

providing an outcome by an executable instruction stored on the nontransitory computer-readable medium, a plurality of contributing antecedents, and a plurality of preceding antecedents;

categorizing, by an executable instruction stored on the nontransitory computer-readable medium, antecedents and the outcome in cohorts;

assigning, by an executable instruction stored on the nontransitory computer-readable medium, of a unique indexing number for each outcome and antecedent, wherein the unique indexing number is a number set comprising a contributor line number, a cohort number, a combination number, and a counterpart sequence number;

calculating, by an executable instruction stored on the nontransitory computer-readable medium, of contributor line number, wherein the contributor line number of the antecedent is determined by an antecedent formula dependent on the contributor line number assigned to the outcome; and calculating, by an executable instruction stored on the nontransitory computer-readable medium, the contributor line number for each antecedent using the following formula:

$$M_{cn} = P_C + (n-1) \times N^{C-2}$$

where $M_{cn}$ is the contributor line number for the antecedent, $P_C$ is the contributor number for the direct outcome of the antecedent, n is a number (an integer from 1 through a maximum of N) for the associated antecedent for the outcome, N is a total number of direct contributors per cohort, and C is the cohort of the antecedent.

2. The method for numbering antecedents by executing computer-executable instructions stored on a nontransitory computer-readable medium as claimed in claim 1 comprises:
wherein the total number of contributors is the number of direct antecedents associated with each of the outcomes.

3. The method for numbering antecedents by executing computer-executable instructions stored on a nontransitory computer-readable medium as claimed in claim 1 comprises:
wherein each outcome has the same total number of contributors;
wherein the plurality of preceding antecedents are the preceding antecedents of the same plurality of antecedents; and
wherein the calculating process is repeated when the unique indexing number is calculated for the preceding antecedents of the contributing antecedent and the contributing antecedents becomes the outcome of the preceding antecedents with respect to the formula.

4. The method for numbering antecedents by executing computer-executable instructions stored on a nontransitory computer-readable medium as claimed in claim 1 comprises:
wherein if two outcomes share a common group of antecedents, one outcome is designated a primary outcome and the second outcome is designated a secondary outcome; and
wherein another unique indexing number is required for the secondary outcome, either replacing or retained as equivalent to the original unique indexing number.

5. The method for numbering antecedents by executing computer-executable instructions stored on a nontransitory computer-readable medium as claimed in claim 1 comprises:
wherein the combination number and the counterpart sequence number are identifiers of antecedents within a group sharing the contributor line number and the cohort number.

6. The method for numbering antecedents by executing computer-executable instructions stored on a nontransitory computer-readable medium as claimed in claim 1 comprises:
assigning, by an executable instruction stored on the nontransitory computer-readable medium, of an arbitrary character for the combination number and the sequence number if unknown, wherein the arbitrary character can be characters selected from the group consisting of U, ?, 0.

7. A method for numbering antecedents by executing computer-executable instructions stored on a nontransitory computer-readable medium comprises:
providing, by an executable instruction stored on the nontransitory computer-readable medium, an antecedent, a plurality of contributing outcomes, and a plurality of following antecedents;
categorizing, by an executable instruction stored on the nontransitory computer-readable medium, antecedents and the outcome in cohorts;
assigning, by an executable instruction stored on the nontransitory computer-readable medium, of a unique indexing number for each outcome and antecedent, wherein the unique indexing number is a number set comprising a contributor line number, a cohort number, a combination number, and a counterpart sequence number;
calculating, by an executable instruction stored on the nontransitory computer-readable medium, of contributor line number, wherein the contributor line number of the outcome is determined by an outcome formula dependent on the contributor line number assigned to the antecedent; and
calculating, by an executable instruction stored on the nontransitory computer-readable medium, the contributor line number for each outcome using the following formula:

$$M_{cn} = P_C + (n-1) \times N^{C-2}$$

where $M_{cn}$ is the contributor line number for the outcome, $P_C$ is the contributor number for the direct antecedent of the outcome, n is a number (an integer from 1 through a maximum of N) for the associated outcome for the antecedent, N is a total number of direct contributors per cohort, and C is the cohort of the outcome.

8. The method for numbering antecedents by executing computer-executable instructions stored on a nontransitory computer-readable medium as claimed in claim 7 comprises:
   wherein the total number of contributors is the number of direct outcomes associated with each of the antecedent.

9. The method for numbering antecedents by executing computer-executable instructions stored on a nontransitory computer-readable medium as claimed in claim 7 comprises:
   wherein each antecedent has the same total number of contributors;
   wherein the plurality of following outcomes are the following outcomes of the same plurality of outcomes; and
   wherein the calculating process is repeated when the unique indexing number is calculated for the following outcomes of the contributing outcomes and the contributing outcomes becomes the antecedent of the following outcomes with respect to the formula.

10. The method for numbering antecedents by executing computer-executable instructions stored on a nontransitory computer-readable medium as claimed in claim 7 comprises:
    wherein if two antecedents share a common group of antecedents, one antecedent is designated a primary antecedent and the second antecedent is designated a secondary antecedent; and
    wherein another unique indexing number is required for the secondary antecedent, either replacing or retained as equivalent to the original unique indexing number.

11. The method for numbering antecedents by executing computer-executable instructions stored on a nontransitory computer-readable medium as claimed in claim 7 comprises:
    wherein the combination number and the counterpart sequence number are identifiers of outcomes within a group sharing the contributor line number and the cohort number.

12. The method for numbering antecedents by executing computer-executable instructions stored on a nontransitory computer-readable medium as claimed in claim 7 comprises:
    assigning, by an executable instruction stored on the nontransitory computer-readable medium, of an arbitrary character for the combination number and the sequence number if unknown, wherein the arbitrary character can be characters selected from the group consisting of U, ?, 0.

13. A method for numbering antecedents by executing computer-executable instructions stored on a nontransitory computer-readable medium comprises:
    providing, by an executable instruction stored on the nontransitory computer-readable medium, an outcome, a plurality of contributing antecedents, and a plurality of preceding antecedents;
    categorizing, by an executable instruction stored on the nontransitory computer-readable medium, antecedents and the outcome in cohorts;
    assigning, by an executable instruction stored on the nontransitory computer-readable medium, of a unique indexing number for each outcome and antecedent, wherein the unique indexing number is a number set comprising a contributor line number, a cohort number, a combination number, and a counterpart sequence number;
    calculating, by an executable instruction stored on the nontransitory computer-readable medium, of contributor line number, wherein the contributor line number of the antecedent is determined by an antecedent formula dependent on the contributor line number assigned to the outcome;
    wherein the combination number and the counterpart sequence number are identifiers of antecedents within a group sharing the contributor line number and the cohort number;
    assigning, by an executable instruction stored on the nontransitory computer-readable medium, of an arbitrary character for the combination number and the sequence number if unknown, wherein the arbitrary character can be characters selected from the group consisting of U, ?, 0; and
    calculating, by an executable instruction stored on the nontransitory computer-readable medium, the contributor line number for each antecedent using the following formula:

$$M_{cn} = P_C + (n-1) \times N^{C-2}$$

where $M_{cn}$ is the contributor line number for the antecedent, $P_C$ is the contributor number for the direct outcome of the antecedent, n is a number (an integer from 1 through a maximum of N) for the associated antecedent for the outcome, N is a total number of direct contributors per cohort, and C is the cohort of the antecedent.

14. The method for numbering antecedents by executing computer-executable instructions stored on a nontransitory computer-readable medium as claimed in claim 13 comprises:
    wherein each outcome has the same total number of contributors;
    wherein the plurality of preceding antecedents are the preceding antecedents of the same plurality of antecedents; and
    wherein the total number of contributors is the number of direct antecedents associated with each of the outcomes.

15. The method for numbering antecedents by executing computer-executable instructions stored on a nontransitory computer-readable medium as claimed in claim 13 comprises:
    wherein the calculating process is repeated when the unique indexing number is calculated for the preceding antecedents of the contributing antecedent and the contributing antecedents becomes the outcome of the preceding antecedents with respect to the formula;
    wherein if two outcomes share a common group of antecedents, one outcome is designated a primary outcome and the second outcome is designated a secondary outcome; and
    wherein another unique indexing number is required for the secondary outcome, either replacing or retained as equivalent to the original unique indexing number.

* * * * *